(12) United States Patent
Davis

(10) Patent No.: US 10,306,974 B2
(45) Date of Patent: Jun. 4, 2019

(54) POCKET TAPE RULE HOLDER ASSEMBLY

(71) Applicant: Stephen Alan Davis, Des Moines, IA (US)

(72) Inventor: Stephen Alan Davis, Des Moines, IA (US)

( * ) Notice: Subject to any disclaimer, the term of this patent is extended or adjusted under 35 U.S.C. 154(b) by 129 days.

(21) Appl. No.: 13/971,710

(22) Filed: Aug. 20, 2013

(65) Prior Publication Data

US 2018/0184791 A1    Jul. 5, 2018

(51) Int. Cl.
*A45F 5/02* (2006.01)
*G01B 3/10* (2006.01)
*F16B 2/24* (2006.01)

(52) U.S. Cl.
CPC .............. *A45F 5/022* (2013.01); *A45F 5/02* (2013.01); *A45F 5/021* (2013.01); *G01B 3/1071* (2013.01); *A45F 2200/0575* (2013.01); *F16B 2/245* (2013.01); *G01B 2003/1074* (2013.01)

(58) Field of Classification Search
CPC .. A45F 5/022; A45F 2200/0575; F16B 2/245; G01B 3/1071; G01B 2003/1074
See application file for complete search history.

(56) References Cited

U.S. PATENT DOCUMENTS

| | | | | |
|---|---|---|---|---|
| 3,091,378 A * | 5/1963 | O'Dwyer | ................. | A45F 5/00 224/668 |
| 3,937,373 A * | 2/1976 | Artz | ........................ | A45F 5/02 224/666 |
| 4,598,027 A * | 7/1986 | Johnson | .................... | A45F 5/02 156/212 |
| 5,025,966 A * | 6/1991 | Potter | ....................... | A45F 5/02 224/183 |
| 5,123,525 A * | 6/1992 | Orlowski | .............. | A45C 11/04 206/5 |
| 5,758,807 A * | 6/1998 | Wright | ...................... | A45F 5/02 224/183 |
| 6,824,028 B2 * | 11/2004 | Mutai | ....................... | A45F 5/02 224/269 |
| 7,077,303 B2 * | 7/2006 | Zega | ......................... | A45F 5/00 224/242 |
| 2004/0065709 A1* | 4/2004 | Dillenberger | ............. | A45F 5/02 224/682 |
| 2005/0133561 A1* | 6/2005 | Kimball | .................... | A45F 5/02 224/674 |
| 2007/0170220 A1* | 7/2007 | Fragassi, III | ............. | A45F 5/02 224/660 |
| 2007/0180726 A1* | 8/2007 | Harrell | ...................... | A45F 5/02 33/760 |

(Continued)

*Primary Examiner* — Corey N Skurdal
(74) *Attorney, Agent, or Firm* — McKee, Voorhees & Sease, PLC

(57) ABSTRACT

The tape rule holding assembly includes an engaging member, which can be made of a flat steel spring, folded over itself to form a clip that can attach securely to a user's pocket. The engaging member is encased within a protective covering, which can be made of leather. The protective covering prevents wear and tear on the user's pocket by reducing the amount of friction created when the holding assembly rubs against the user's pocket. A tool engaging member is attached to the protective covering which allows any tool with a clip, including a tape rule, to slide securely onto it. The tool then hangs conveniently off of the pocket of the user where it is easily accessible.

10 Claims, 2 Drawing Sheets

(56) References Cited

U.S. PATENT DOCUMENTS

2008/0179368 A1\* 7/2008 Williams ............... A45F 3/14
224/682
2008/0302845 A1\* 12/2008 Blechman ............... A45F 5/02
224/678

\* cited by examiner

POCKET TAPE RULE HOLDER ASSEMBLY

CROSS-REFERENCE TO RELATED APPLICATIONS

This application is a continuation application and claims priority to and takes the benefit of U.S. patent application Ser. No. 12/635,654 filed on Dec. 10, 2009 the contents of which are hereby incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not Applicable

BACKGROUND OF THE INVENTION

Field of the Invention

Many tools, including tape measures, have a clip attached to it so that the tool may be clipped to a user's waist, belt or pocket. The main problem with such clips is that they tend to tear up the area of clothing where they are attached. The present invention relates to an improved tape rule holder assembly for removably attaching a tape measure having a clip to a user's pocket. More specifically, the present invention pertains to a tape measure holding assembly made from a steel clip that has a covering member, preferably made of leather, that prevents the steel from rubbing against the pocket and wearing it out.

Description of Related Art

There is existing prior art that addresses clips that allow tape rules to be clipped to pockets and tape rule holders made of leather. The prior art does not address combining a tape rule holder to be clipped to pockets and such holders being made of leather in a streamlined package.

U.S. Pat. No. 5,038,985 to Chapin discloses an adjustable clip for mounting a tape rule to a user's pocket. The clip is a strip of spring steel mounted directly onto the tape rule casing. The mounting is accomplished by using a screw to attach the clip to the case. U.S. Pat. No 4,821,933 to Seber discloses a leather tape rule holder comprised of two flat pieces of leather. One piece of leather has belt slots to allow the holder to be attached directly to a user's belt. U.S. Pat. No. 5,388,741 to Hillinger discloses a holding assembly for a tape rule that has a clip that allows for a separate assembly to attach to a user's belt. This allows for the tape rule to be placed into the holding assembly, rather than mounting the clip directly to the tape rule casing.

BRIEF SUMMARY OF THE INVENTION

The present invention relates to a tape rule holding assembly includes a flat steel spring folded over to provide a clip that allows the holding assembly to be attached to a user's pocket. The flat steel spring is encased within a protective covering that prevents the steel spring from rubbing against the user's pocket and wearing it out. The protective covering can be made of leather. Attached to the protective covering is a holding member that allows tools that have a clip to slide onto the holding member. Many existing tape rules already have this clip on their backside.

BRIEF DESCRIPTION OF THE SEVERAL VIEWS OF THE DRAWINGS

The invention may take form in certain components and structures, preferred embodiments of which are illustrated in the accompanying drawings which form a part hereof and wherein.

DETAILED DESCRIPTION OF THE INVENTION

Figure 1:
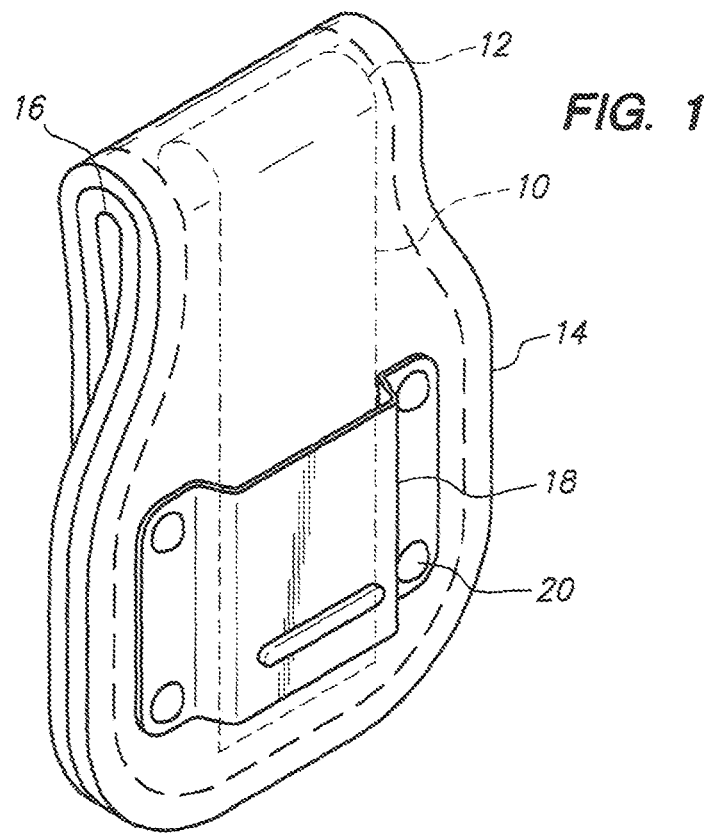
FIG. 1 is a perspective view of the tape measure holding assembly as viewed from the left side.
Figure 2:
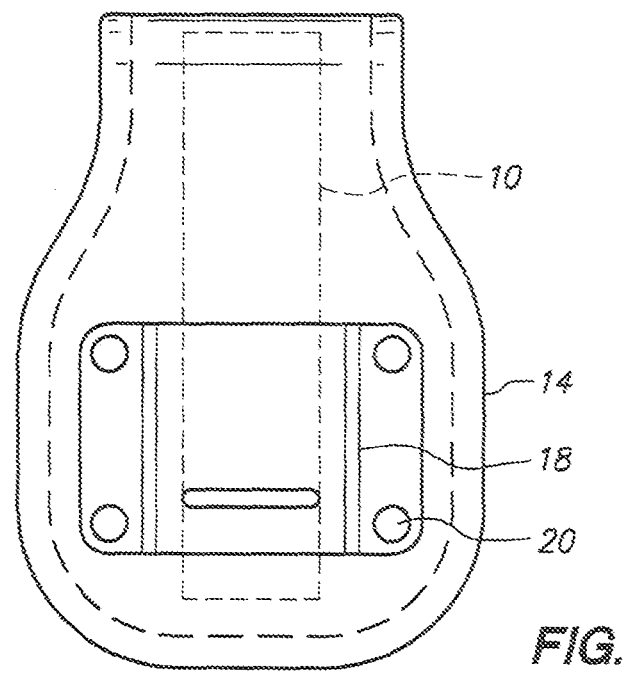
FIG. 2 is a front view of the tape measure holding assembly.
Figure 3:
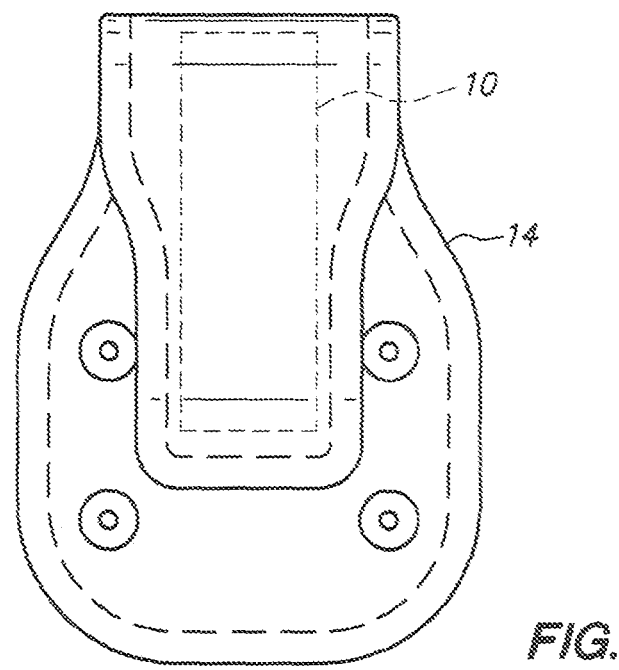
FIG. 3 is a back view of the tape measure holding assembly.
Figure 4:
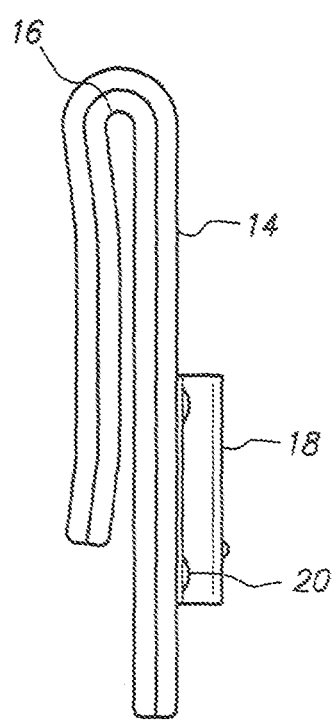
FIG. 4 is a side view of the tape measure holding assembly.

The invention is carried out as illustrated in FIGS. 1-4. A clothing engaging member/clip 10 is used to provide the rigid structure that allows the holding assembly to securely attach to a user's pocket. The clip 10 is preferably made of a flat steel spring, but can be made of anything is flexible enough to be folded 12 but rigid enough to maintain the shape of the clip to allow it to securely attach to a user's pocket. A protective covering 14 then encases the clip 10 to prevent the clip 10 from rubbing against the user's pocket and wearing it out. This protective covering 14 works well if made of leather, but can also be made of plastic or anything that is durable enough to support the weight of the tool engaging member and can also hold the clip securely within the covering. A tool engaging member 18 is firmly attached to the protective covering 14 so that the tool engaging member 18 can support the weight of any tool that has a clip on its casing. The tool engaging member 18 was designed as being made of steel but can also be made of plastic or any material that can handle the weight of a tool and not chip or break. The tool engaging member 18 is preferably attached to the protective covering with a set of rivets 20. However, the tool engaging member 18 can also be attached with an adhesive, screws or any other fastener that allows the tool engaging member 18 to be attached securely enough that it will not be dislodged from the protective covering by the weight of a tool.

Tape rules are one of the most common tools that already come with a clip that can slide onto the tool engaging member. Many repair and construction workers are already used to placing their tape rules in or around their pocket, so a tape rule is the most likely tool to be attached to the holding assembly. However, impact drivers are tools that are rapidly increasing in popularity with construction and repair workers and such impact drivers usually come with a clip on the casing. Therefore, impact drivers can also be attached to this holding assembly.

Any other tool that has a clip on its casing can also be attached, depending on what a user prefers to have held around their pocket. Jeans are the preferable apparel for a user of this holding assembly as jeans are durable and can withstand the weight of the assembly and the tool. Workman's overalls are made of similar material as jeans and their pockets are also capable of withstanding such weight. The holding assembly can be attached to the pocket of virtually any apparel, so long as the apparel is made of sturdy enough material to withstand the weight of a tape rule or other tool.

An alternative embodiment of the invention where the protective covering 14 is not used, is possible if the clip 10 can be made of a sturdy enough material to retain its shape and attaching capability. Additionally, the clip 10 needs to be machined in such a way that it is smooth enough to prevent generating excessive friction when rubbing against the user's pocket and causing wear and tear on the pocket.

What is claimed is:

1. A device to secure a tape measure to a pants pocket, the tape measure having a housing with an external clip, the device comprising:
    a U-shaped clip having inner and outer legs with opposite ends;
    a first layer of protective covering fully covering one side of the legs of the clip from one end to the other end;
    a second layer of protective covering fully covering an opposite side of the legs of the clip from one end to the other end;
    the inner leg with the coverings being sized to fit in the pocket, and the outer leg with the coverings residing outside the pocket;
    a C-shaped member having opposite ends fixed at least to the second layer and a central web spaced from the second layer; and
    the C-shaped member being size to receive the external clip of the tape measure between the web and the second layer.

2. The device of claim 1 wherein the inner leg is narrower than the outer leg.

3. The device of claim 1 wherein the outer leg has opposite to lateral edges and the C-shaped member resides between the edges of the outer leg.

4. The device of claim 1 wherein C-shaped member is riveted to the outer leg.

5. The device of claim 1 wherein protective coating includes first and second layers sandwiched about the U-shaped clip.

6. A tool holder comprising:
    a clip having spaced apart inner and outer legs and a web connecting the legs, and the inner leg being adapted for insertion into a pocket;
    the clip including an internal 1-piece, U-shaped, spring metal member encased within a protective layer;
    the protective layer including two sheets of material which fully cover the metal member;
    a 1-piece receiver secured to the protective layer on opposite lateral sides of the metal member and having a portion spaced from the protective layer to receive the tool.

7. The tool holder of claim 6 wherein the receiver is C-shaped with opposite sides fixed to the outer leg.

8. The tool holder of claim 6 wherein the outer leg is wider than the inner leg.

9. The tool holder of claim 6 wherein the outer leg has a perimeter edge and the receiver resides within the perimeter edge.

10. The device of claim 6 wherein the central web of the C-shaped member is laterally opposite the outer leg of the clip.

* * * * *